Figure 1:
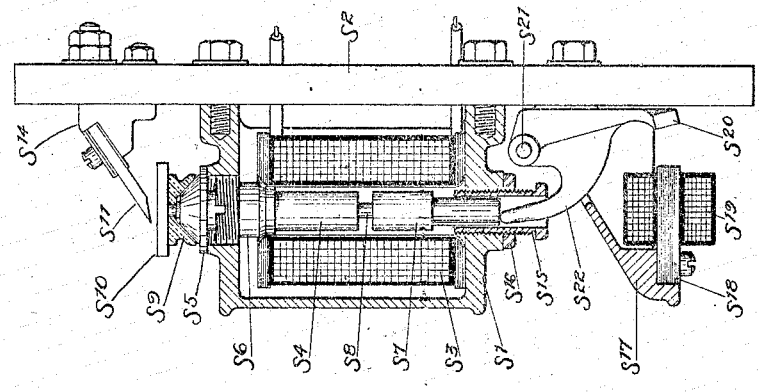

H. F. STRATTON.
ELECTRIC SWITCH.
APPLICATION FILED JULY 27, 1911.

1,134,422.

Patented Apr. 6, 1915.
2 SHEETS—SHEET 1.

WITNESSES
Elva Staniels
Alice E. Duff

INVENTOR
H. F. Stratton
BY
F. N. Barber
ATTORNEY

H. F. STRATTON.
ELECTRIC SWITCH.
APPLICATION FILED JULY 27, 1911.
1,134,422.
Patented Apr. 6, 1915.
2 SHEETS—SHEET 2.
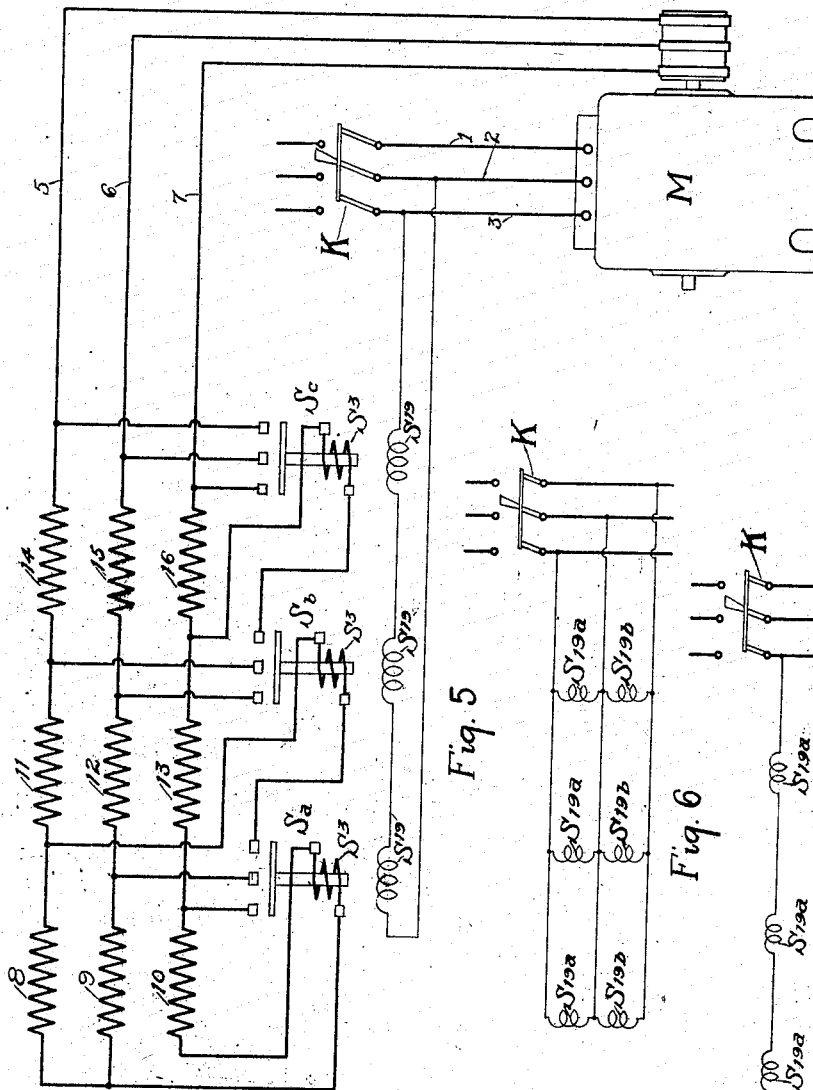
WITNESSES
Elva Stanick
Alice E. Duff
INVENTOR
H. F. Stratton
BY
F. N. Barber
ATTORNEY

UNITED STATES PATENT OFFICE.

HARRY F. STRATTON, OF CLEVELAND, OHIO, ASSIGNOR TO THE ELECTRIC CONTROLLER AND MANUFACTURING COMPANY, OF CLEVELAND, OHIO, A CORPORATION OF OHIO.

ELECTRIC SWITCH.

1,134,422.   Specification of Letters Patent.   Patented Apr. 6, 1915.

Application filed July 27, 1911. Serial No. 640,885.

*To all whom it may concern:*

Be it known that I, HARRY F. STRATTON, a citizen of the United States, residing at Cleveland, in the county of Cuyahoga and State of Ohio, have invented new and useful Improvements in Electric Switches, of which the following is a specification.

My invention relates to magnetically-operated switches for controlling the flow of current in alternating current motors. I show these switches employed in a controller by which an alternating current motor may be started and brought up to speed by automatically cutting resistance out of the secondary circuit of the motor. I make use of magnetically-operated switches, each of whose operating windings is connected in series with the secondary circuit and short-circuited on closure of the switch contacts. I provide for each switch a holding, or maintaining magnet which is excited from the primary circuit and does not necessarily aid in operating the switch, but is merely used to hold the switch closed after it has operated. The operating winding being in circuit only while the switch is being actuated, its magnetic circuit or frame does not need to be laminated. The holding magnet needs to be only strong enough to hold the switch closed, and therefore, by a proper construction of parts the force it must exert can be made much smaller than would be required for operating the switch through its whole movement. I prefer also to so construct the switch that the pull of the holding magnet is multiplied through a lever mechanism thereby reducing the size of the holding magnet and the amount of current required for exciting it. Since the holding magnet is energized during the whole time that the controller is in service, its magnetic circuit should be laminated, or, at least, that part which is embraced by the winding.

I consider a controller employing a switch constructed in such a manner as just described, which has an operated winding adapted to be connected in circuit only a short period, its magnetic circuit being not laminated, and a holding magnet of small size with more or less of its magnetic circuit laminated more desirable than the usual type of alternating current switch with a single winding which must be large enough to operate the switch and hold it closed. The latter type of switch is usually constructed with toggle joints and spring contact devices which are objectionable on account of the large number of small parts required for each switch.

In order to more fully describe my invention I will refer to the accompanying drawings, in which—

Figure 2:
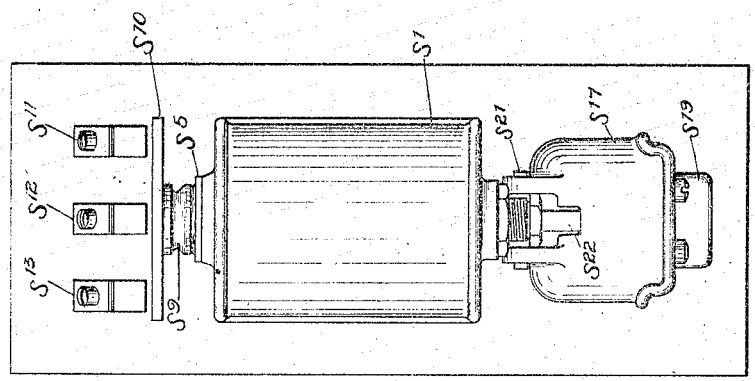
Figures 3, 4:
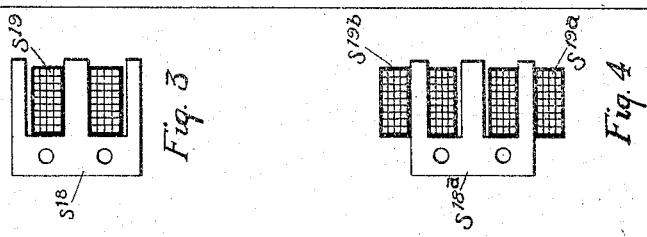

Figure 1 is a vertical section of a switch, constructed in accordance with my invention, parts being in side elevation; Fig. 2, a front view of the switch; Figs. 3 and 4, sectional views showing two methods of constructing the holding, or maintaining, magnets; Fig. 5, a wiring diagram of the connections for an induction motor starter; and Figs. 6 and 7, diagrams showing alternate methods of connecting the holding windings of the switches.

Referring to Figs. 1 and 2, S' represents a frame of magnetic material bolted to the insulating support $S^2$ and containing the winding $S^3$, which has an axial opening. In the upper part of this opening is the steel plug $S^4$ provided with the flange $S^5$ resting on the frame S'. The coil-holding sleeve $S^6$ surrounds the upper end of the plug and is screwed into the top of the frame S'. The steel plunger $S^7$ is seated in the axial opening in the coil below the plug $S^4$ and is connected to the lower end of the non-magnetic rod $S^8$, which extends up through the plug $S^4$ and carries the contact-plate holder $S^9$ at its upper end. $S^{10}$ is the contact-plate on the top of the holder $S^9$, and is arranged to connect together the three brushes $S^{11}$, $S^{12}$, $S^{13}$, supported by suitable fixed contact holders, of which one only, marked $S^{14}$, is shown. $S^{15}$ is an adjustable sleeve of magnetic material which surrounds the reduced lower end of the plunger $S^7$ and is screwed into the lower portion of the frame S'. The nut $S^{16}$ working on the sleeve and bearing against the bottom of the frame serves as a lock-nut for the sleeve.

The switch referred to is fully described in Canfield's application, Serial Number 583,000. This switch is peculiar in that, when its winding $S^3$ is energized above a predetermined value, the plunger $S^7$ is caused to remain in its lowered or unactuated position, but when the current is lowered to the predetermined value, the plunger is caused to rise and carry the contact plate $S^{10}$ into engagement with the brushes $S^{11}$, $S^{12}$, and $S^{13}$.

I place below the switch just described the hollow casting $S^{17}$ which contains the holding, or maintaining, magnet $S^{18}$ referred to. It has a laminated core or frame and may have as in Fig. 3, a single winding $S^{19}$, or a number of windings $S^{19a}$ and $S^{19b}$ on separate cores, as shown on Fig. 4.

$S^{20}$ is the armature of the magnet $S^{18}$ and is mounted on the pivot $S^{21}$ so that its lower end may swing toward and from the magnet $S^{18}$. The armature $S^{20}$ has a finger $S^{22}$ with its free end in contact with the lower end of the reduced extension of the plunger $S^7$. The material of the armature is distributed so that, if free to act, its lower end will swing toward the magnet $S^{18}$. If both coils are deënergized, the weight of the plunger $S^7$ and the parts supported thereby causes the armature $S^{20}$ to move into the position shown in the drawing. When in this position, the magnet $S^{18}$ cannot pull the armature $S^{20}$ across the wide air-gap between itself and the adjacent poles of the magnet and thereby operate the switch; but when the switch is operated by the winding $S^3$, the armature $S^{20}$ swings by gravity toward the magnet $S^{18}$, the finger $S^{22}$ following the lower end of the plunger $S^7$. When the armature $S^{20}$ has moved so as to reduce the said air-gap sufficiently, it will be acted upon by the magnet $S^{18}$ with sufficient force to hold the switch contact plate $S^{10}$ against the said contact brushes; and the winding $S^3$ may, therefore, be deënergized as soon as the contact plate $S^{10}$ has engaged the brushes.

In order that the force exerted by the magnet $S^{18}$ on the armature $S^{20}$ may be much less than that required between the contact plate $S^{10}$ and the contact brushes $S^{11}$ I have constructed the parts so that the distance from the fulcrum or pivot $S^{21}$ of the armature $S^{20}$ to the lower end thereof which is acted upon by the magnet $S^{18}$ is greater than the distance from the said fulcrum or pivot to the upper end of the armature on which the lower end of the plunger $S^7$ rests. By this arrangement I can use a comparatively small holding magnet which is cheap to construct. The power required to hold the switch closed is also reduced to a minimum.

In Fig. 3, I have shown the magnet $S^{18}$ with a single coil $S^{19}$ to be connected across one pair of the primary mains; and in Fig. 4 I have shown the magnet $S^{18a}$ with two coils $S^{19a}$ and $S^{19b}$, which may be connected across two different pairs of the primary mains, thereby forming a polyphase magnet exerting at all times an attraction on the armature $S^{20}$ and thereby reducing the chatter or noise to a minimum.

Referring now to the wiring diagram of the system of control shown in Fig. 5, the primary wires 1, 2, 3, of the induction motor M are energized by closing the switch K. The secondary wires 5, 6, 7, have resistances 8 to 16 arranged to be short-circuited in groups by the closure of switches $S^a$, $S^b$, $S^c$, constructed as shown in Figs. 1 and 2. When the main switch K is closed, current flows in the primary wires 1, 2, and 3 and through the holding windings $S^{19}$, which are connected in series across the wires 2 and 3. Current in the secondary wires 5, 6, and 7 is controlled by the resistances 8 to 16. The first rush of current in the winding $S^3$ of the switch $S^a$, which is connected across the resistances 9 and 10, will be sufficient to lock the switch $S^a$ open. The switch $S^a$ remains locked open until the current in its winding decreases to a point at which the switch is adjusted to operate, at which time it will close its contacts and short-circuit the resistances 8, 9, and 10 and its operating winding $S^3$. The winding $S^{19}$ below the switch holds the latter closed. The closure of the switch $S^a$ also causes the winding $S^3$ of the switch $S^b$ to be energized. The increased amount of current in the secondary circuit due to the cutting out of the resistances 8, 9, and 10 causes the switch $S^b$ to be locked open until the current in its winding drops to a predetermined value, at which time the switch $S^b$ closes, short-circuiting the resistances 11, 12, and 13 and the winding $S^3$ of the switch $S^b$ which remains closed due to its holding coil $S^{19}$. The closure of the switch $S^b$ causes the winding $S^3$ of the switch $S^c$ to receive current. This switch is then locked open by the increase of current in the secondary circuit. When the current again decreases to a predetermined value the switch $S^c$ closes, short-circuiting the remaining group of resistances 14, 15, and 16 and its own operating winding $S^3$, the switch being then held closed by its holding winding $S^{19}$. The secondary windings of the motor are now entirely short-circuited, and the motor operates at its normal speed. When it is desired to stop the motor the switch K is opened, which cuts off the motor current. The holding windings $S^{19}$ are also deënergized by the opening of the switch K, and the switches $S^a$, $S^b$, $S^c$ drop open. Since the resistance controlling switches cannot open until the main switch K is opened, the contacts of the switches $S^a$, $S^b$, $S^c$ do not carry current at the time the switches open, making it unnecessary to provide blow-out magnets or other devices for extinguishing arcs. I have shown the actuating windings of the three accelerating switches connected in different phases, but it is obvious that they can all be connected in the same phase without altering the principles of the system described. I have shown the holding magnets in Fig. 5 as being single-phase magnets connected in series, but it will be readily understood that they may be connected in parallel.

In Figs. 6 and 7, I have shown the holding windings on each switch arranged to be excited on more than one pair of leads, each holding magnet having two windings $S^{19a}$ and $S^{19b}$. These windings may be connected in parallel, as shown in Fig. 6, or in series, as shown in Fig. 7. Since the current in one winding $S^{19a}$ of a holding magnet is out of phase with the current in the other winding $S^{19b}$, there is always a resultant magnetization which prevents the chattering of the switch parts.

In the type of motor shown where resistances are used in the secondary circuit of the motor to vary its speed, the windings receiving energy from the secondary circuit of the motor are subjected to a current whose frequency gradually diminishes. When the frequency becomes very low the time between maximum magnetization in one direction and the maximum magnetization in the other direction is so great that, in the case of a switch, the switch would open and close its contacts in step with the frequency. By placing the maintaining windings in the primary circuit where the windings are subjected to a current of substantially constant frequency, the switch would remain closed. Although I have shown these magnetic devices arranged to control the starting of an alternating current motor, I wish it to be understood that these devices can be used in various ways in electric circuits in which an operating magnet may be deënergized, its holding function being transferred to a holding magnet.

My invention can be applied to magnetically-operated devices of many forms, such as a device for operating electric brakes in which it becomes necessary to laminate the comparatively small holding magnet only which is energized while the apparatus is in service.

Although I have shown my invention applied to a three-phase system, it will be understood that it can be readily adapted for use in a single-phase or any polyphase system.

I claim—

1. In a switch, a movable switch member, a winding for moving the said member toward its closed position, and electro-magnet, and a lever biased to move a portion thereof toward the electro-magnet, the lever having a portion acted on by the said switch member when in its initial position to prevent the lever from operating under its bias, and the lever having operated under its bias being attracted and held by the electro-magnet to prevent the return of the switch member to its initial position.

2. In a switch, a movable switch-operating member, an operating winding therefor in the circuit controlled by the switch, the contacts of the switch being arranged when closed to deënergize the winding, a second winding, and an armature therefor normally beyond but biased toward the effective influence of the second winding, and restrained by the movable member while in its initial position from movement into the influence of the second winding, a portion of the armature being arranged to hold the switch member closed when the armature is held by the second winding.

Signed at Cleveland, Ohio, this 25th day of July, A. D. 1911.

HARRY F. STRATTON.

Witnesses:
H. M. DIEMER,
J. H. HALL.

---

It is hereby certified that in Letters Patent No. 1,134,422, granted April 6, 1915, upon the application of Harry F. Stratton, of Cleveland, Ohio, for an improvement in "Electric Switches," an error appears in the printed specification requiring correction as follows: Page 3, line 55, for the word "and" read *an;* and that the said Letters Patent should be read with this correction therein that the same may conform to the record of the case in the Patent Office.

Signed and sealed this 4th day of May, A. D., 1915.

[SEAL.]

R. F. WHITEHEAD,
*Acting Commissioner of Patents.*